US008849271B2

(12) United States Patent
Moberg et al.

(10) Patent No.: US 8,849,271 B2
(45) Date of Patent: Sep. 30, 2014

(54) OPTIMIZED HANDOVER CONFIGURATION

(75) Inventors: Peter Moberg, Stockholm (SE); Niklas Johansson, Sollentuna (SE); Gunnar Mildh, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 149 days.

(21) Appl. No.: 12/969,050

(22) Filed: Dec. 15, 2010

(65) Prior Publication Data

US 2011/0195708 A1 Aug. 11, 2011

(30) Foreign Application Priority Data

Feb. 9, 2010 (EP) ..................................... 10153041

(51) Int. Cl.
*H04W 24/00* (2009.01)
(52) U.S. Cl.
USPC .......................................... 455/424; 455/436
(58) Field of Classification Search
CPC ..... H04W 24/00; H04W 24/02; H04W 24/04; H04W 24/08; H04W 24/10; H04W 36/00
USPC ................................................. 455/424, 436
See application file for complete search history.

(56) References Cited

U.S. PATENT DOCUMENTS

| | | | |
|---|---|---|---|
| 2009/0005031 A1* | 1/2009 | Van Lieshout et al. | 455/425 |
| 2009/0141666 A1* | 6/2009 | Jin et al. | 370/315 |
| 2010/0273488 A1* | 10/2010 | Kim | 455/436 |
| 2010/0279601 A1* | 11/2010 | Phan et al. | 455/7 |
| 2011/0280127 A1* | 11/2011 | Raaf et al. | 370/230 |
| 2012/0282932 A1* | 11/2012 | Yu et al. | 455/437 |

FOREIGN PATENT DOCUMENTS

| | | |
|---|---|---|
| WO | 2008/103084 A1 | 8/2008 |
| WO | 2009/107950 A2 | 9/2009 |

OTHER PUBLICATIONS

International Preliminary Report on Patentability in corresponding International Application No. PCT/SE2011/050048 completed on May 9, 2012.
International Search Report for corresponding PCT/SE2011/050048 mailed Mar. 25, 2011.
Written Opinion for corresponding PCT/SE2011/050048 mailed Mar. 25, 2011.
3GPP TR 36.912 V2.0.0, "Technical Specification Group Radio Access Network; Feasibility study for Further Advancements for E-UTRA (LTE-Advanced)", Technical Report, Aug. 2009, (Release 9).
3GPP TS 36.331 V9.0.0, "Technical Specification Group Radio Access Network; Evolved Universal Terrestrial Radio Access E-UTRA, Radio Resource Control (RRC); Protocol specification", Technical Specification, Sep. 2009, (Release 9).

* cited by examiner

*Primary Examiner* — Patrick Edouard
*Assistant Examiner* — Shantell L Heiber
(74) *Attorney, Agent, or Firm* — Patent Portfolio Builders PLLC

(57) ABSTRACT

A method for power measurements in a cellular communication system comprises receiving measurement configuration orders. Operation of a power meter is controlled in dependence on the measurement configuration orders. Reference signal received powers are measured. A measurement report is compiled and transmitted. The measurement configuration orders comprise cell status information associated with neighboring cells and measurement instructions that are dependent of the cell status of respective cell. The cell status information comprises information about whether the neighboring cell is of a different type than the serving cell. Controlling of the operation of the power meter and/or compiling of the measurement report is performed in dependence on the cell status of the neighboring cell. A method for handover based on such measurement reports is also disclosed as well as Node Bs and user equipments configured to perform such methods.

16 Claims, 13 Drawing Sheets

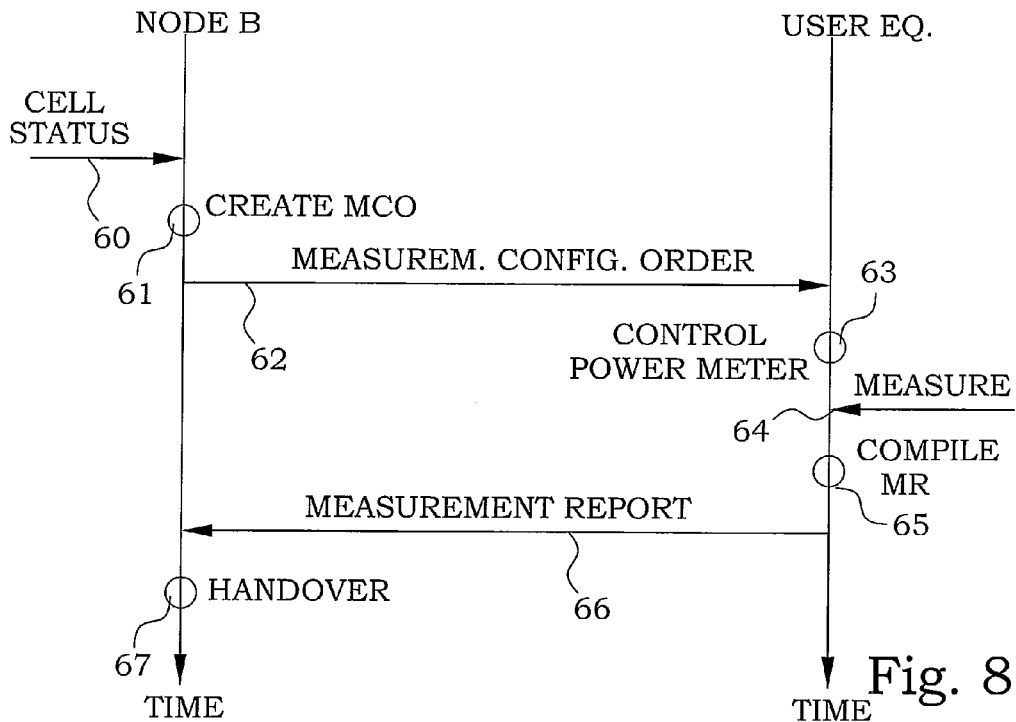
Fig. 8
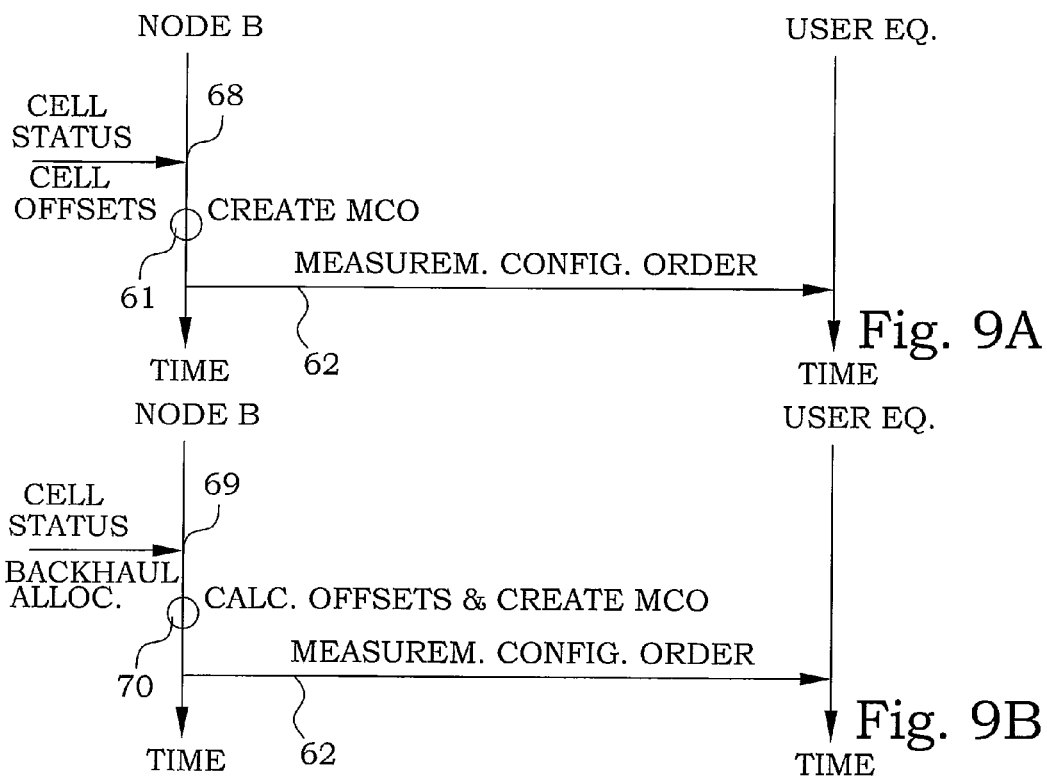
Fig. 9A
Fig. 9B

OPTIMIZED HANDOVER CONFIGURATION

TECHNICAL FIELD

The present invention relates in general to devices and methods in a cellular communication system, and in particular to devices and methods associated with handover procedures.

BACKGROUND

LTE-Advanced (Long-Term Evolution) is currently standardised in 3GPP (3rd Generation Partnership Project). The LTE-Advanced standard corresponds to the release 10 of LTE. In release 10 it has been decided to support "Type 1" relay nodes (RN). A type one relay is characterised by some important characteristics. A type one relay controls cells, each of which appears to a UE (User Equipment) as a separate cell distinct from the donor cell. The cells shall have their own Physical Cell ID (as defined in LTE Rel-8) and transmit their own synchronization channels, reference symbols etc. In the context of single-cell operation, the UE receives scheduling information and HARQ (Hybrid Automatic Repeat-reQuest) feedback directly from the RN and send its control channels to the RN. A type one relay shall appear as a Rel-8 eNB (enhanced Node B) to Rel-8 UEs, i.e. be backwards compatible. This means basically that from a UE perspective, there is no difference being served by an eNB or a type 1 relay.

The type 1 relays communicate with a donor eNB and one or several UEs. Between the relay and the eNB, transmissions are done on the backhaul link. Transmission between the UE and the relay are done on the access link and the UE and the eNB communicates via the direct link.

If the transmissions on the backhaul links and the access links in the system are performed within the same frequency band, the relays are referred to as inband relays. To enable inband relays to be functional there is a need to separate the transmissions and receptions at the relay, i.e. the relay cannot transmit and receive at the same time on the same frequency, since this could cause intolerable interference. For this purpose, during a certain subframe, the UEs associated to the relay do not expect to receive any DL (DownLink) data from the relay. Instead, these subframes are used for carrying data from the donor-eNB to the RNs.

UE mobility, when connected to a RN, is handled in the same way as when the UE is connected to the eNB. When the UE is in active mode the RN controls the cell level mobility of the UE with help of the measurement configuration and UE measurement reporting, and by triggering the handover procedure. When the UE is in idle mode the cell selection is controlled by the UE based measurements.

Handover or cell selection between cells is usually done based on downlink RSRP (Reference Signal Received Power). The UE connects to the eNB from which it receives the strongest signal. Alternatively, the cell selection decision can be based on RSRQ (Reference Signal Received Quality) measurements, where also the current interference situation is taken into account.

In normal deployments, the RSRP and/or RSRQ measurements used for mobility provide a good basis to support the correct cell selection decision. The reason is that the RSRQ and RSRP can be mapped reasonably well to an expected data rate in the target cell. For a system with inband relays, this is no longer valid, i.e. the RSRP and/or RSRQ cannot be directly mapped to the experienced data rate of the UE. The quality of the backhaul link as well as the MBSFN (Multimedia Broadcast multicast service Single Frequency Network) configuration, i.e. backhaul subframe configuration, are factors that will affect the end to end throughput that is experienced by the UE when it connects to the RN. The end-to-end bit rate for a user served by a relay is limited by the link that supports the lowest bit rate, depending on the backhaul allocation. It is clear that, in certain situations, a non-negligible portion of the UEs connected to relays would be better off if they were directly connected to the eNB despite a lower RSRP and/or RSRQ. Cell selection is crucial in order to secure improved performance in e.g. a relay enhanced system. The existing tools and algorithms for an optimized cell selection procedure are not sufficient in a relay based deployment.

SUMMARY

A general object of the present invention is to provide devices and methods for improving handover procedures in systems having Node Bs of different types or status.

The above object is achieved by devices and methods according to the enclosed independent patent claims. Different preferred embodiments are defined in dependent claims. In general words, in a first aspect, a user equipment for use in a cellular communication system comprises a receiver, a power meter, a measurement controller and a transmitter. The receiver is configured for receiving measurement configuration orders. The power meter is configured for measuring reference signal received powers. The measurement controller is connected to the receiver and the power meter. The measurement controller is configured to access information comprised in the measurement configuration orders, to control an operation of the power meter, and to obtain measured reference signal received powers from the power meter. The transmitter is connected to the measurement controller. The measurement controller is further configured to compile a measurement report based on the obtained measured reference signal received powers and to provide the measurement report to the transmitter. The transmitter is configured to transmit the measurement report. The measurement configuration orders comprise cell status information associated with neighbouring cells and measurement instructions that are dependent of the cell status of the neighbouring cell from which a reference signal to be measured is received. The cell status information comprises at least information about whether or not the neighbouring cell is a cell of a different type than the serving cell of the user equipment. The measurement controller is also configured to perform at least one of the controlling of the operation of the power meter and the compiling of the measurement report in dependence on the cell status of the neighbouring cell from which the signal to be measured was received.

According to a second aspect, a Node B in a cellular communication system comprises a processor arrangement, a transmitter and a receiver. The transmitter and the receiver are connected to the processor arrangement. A handover control section of the processor arrangement is configured to create measurement configuration orders and to provide the measurement configuration orders to the transmitter. The transmitter is configured to transmit the measurement configuration orders within a cell associated with said Node B. The receiver is configured to receive measurement reports from user equipments within the cell associated with the Node B. The handover control section is further configured to access information comprised in the received measurement reports. The handover control section is further configured for performing handover operations in dependence of the information comprised in the measurement reports. A neighbouring cell surveillance section of the processor arrangement is configured to obtain cell status information associated with neighbouring cells to the cell associated with the Node B. The cell status information comprises at least information about whether or not the neighbouring cell is a cell of a different type than the serving cell of the user equipment. The handover control section is further configured to create measurement configuration orders and/or to perform handover operations in dependence of the cell status information.

According to a third aspect a method for power measuring in a cellular communication system comprises receiving, in a receiver, measurement configuration orders. An operation of a power meter is controlled in dependence on the information comprised in the measurement configuration orders. Reference signal received powers are measured in the power meter. A measurement report is compiled in the measurement controller based on the measured reference signal received powers. The measurement report is transmitted by a transmitter. The measurement configuration orders comprise cell status information associated with neighbouring cells and measurement instructions that are dependent of the cell status of the neighbouring cell from which a reference signal to be measured is received. The cell status information comprises at least information about whether or not the neighbouring cell is a cell of a different type than the serving cell of the user equipment. At least one of the controlling of the operation of the power meter and the compiling of the measurement report is performed in dependence on the cell status of the neighbouring cell from which the signal to be measured was received.

In a fourth aspect, A method for handover in a cellular communication system, comprises obtaining, in a neighbouring cell surveillance section of a processor arrangement, cell status information associated with neighbouring cells to a cell associated with a Node B in which the processor arrangement is comprised. The cell status information comprises at least information about whether or not the neighbouring cell is a cell of a different type than the serving cell of the user equipment. Measurement configuration orders are creating in a handover control section of a processor arrangement. The measurement configuration orders within a cell associated with the Node B are transmitted by a transmitter. Measurement reports are received in a receiver from user equipments within the cell associated with the Node B. Handover operations are performed in the handover control section in dependence of the information comprised in the measurement reports. The measurement configuration orders are created and/or the handover operations are performed in dependence of the cell status information.

The present invention enables an improved cell selection procedure and as a consequence improved user experience, i.e. higher throughput, and system performance, e.g. less interference, better resource utilization and higher capacity.

BRIEF DESCRIPTION OF THE DRAWINGS

The invention, together with further objects and advantages thereof, may best be understood by making reference to the following description taken together with the accompanying drawings, in which:

FIG. 8 is a schematic illustration of an embodiment of the collaboration between a Node B and a user equipment according to the present invention;

FIGS. 9A-B are schematic illustrations of embodiments of collaboration between a Node B and a user equipment according to the present invention having access to different cell status information;

DETAILED DESCRIPTION

Throughout the drawings, the same reference numbers are used for similar or corresponding elements.

In the description below, type 1 relays in LTE are used as an exemplifying embodiment. However, the ideas can be applied also to relays with similar characteristics in other cellular technologies (WCDMA (Wideband Code Division Multiple Access), GSM (Global System for Mobile communications), TD-SCDMA (Time Division-Synchronous Code Division Multiple Access), WiMAX (Worldwide Interoperability for Microwave Access), . . . ). The largest benefits will probably appear when the present invention is applied on inband relays, however, the invention is not limited thereto and can be applied also on other relays. Furthermore, it should be noticed that when being applied, the present invention can be applied to all eNBs in a system including relays, not only relay eNBs or donor eNBs.

Figure 1:
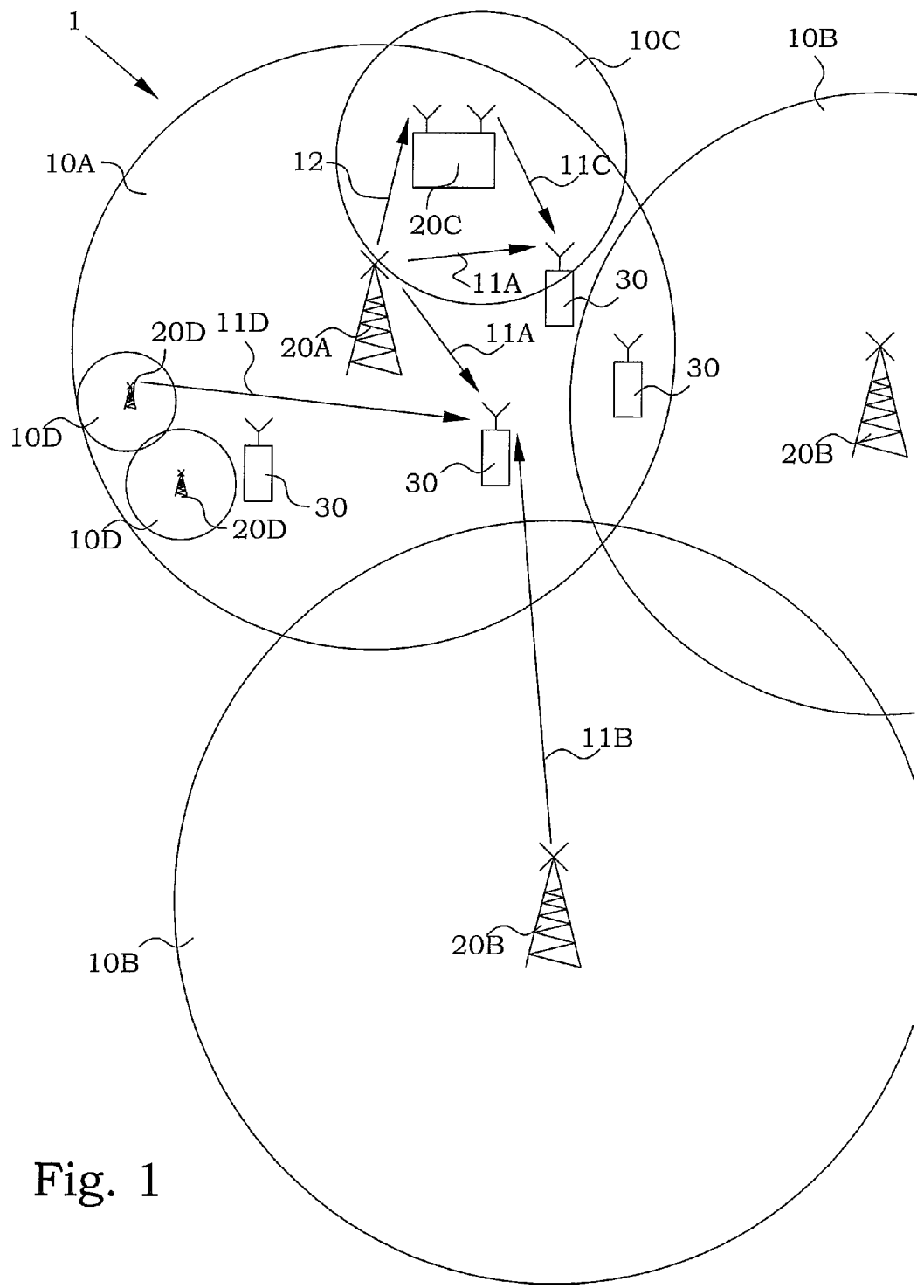
FIG. 1 is a schematic illustration of an embodiment of a cellular communication system utilizing relays.

FIG. 1 illustrates an embodiment of a cellular communication system 1 utilizing relay eNBs 20C. The relay eNB 20C is in the present embodiment a type 1 relay and communicates with a donor eNB 20A and one or several UEs 30. Between the relay eNB 20C and the donor eNB 20A, transmissions are done on a backhaul link 12. Transmissions between the UE 30 and the relay eNB 20C are done on an access link 11C and the UE 30 and the donor eNB 20A communicates via a direct link 11A. The donor eNB 20A has an associated cell 10A and the relay eNB 20C has an associated cell 10C. If the donor eNB 20A acts as a serving eNB, the cell 10A becomes the serving cell. If the relay eNB 20C acts as a serving eNB, the cell 10C becomes the serving cell. Neighbouring eNBs 20B are also present in the cellular communication system 1, each one having a respective associated cell 10B. UEs 30 within the cell of the donor eNB 20A may still have possibilities to receive transmissions 11B from the neighbouring eNBs 20B, which for instance may be of interest for determining if handovers are to be performed. Also other types of Node Bs may be present in the cellular communication system 1. One example is micro cell Node Bs 20D, having an associated micro cell 10D stationary within the cell 10A of the eNB 20A. Transmissions 11D from such other types of Node Bs may also be detectable by UEs 30. Also other types of low-power nodes, such as femto eNBs, pico eNBs etc can be considered.

If the transmissions on the backhaul link 12 and the access link 10C in the cellular communication system 1 are performed within the same frequency band, the relay 20C is referred to as an inband relay. It is also possible to think of a system where the backhaul link 12 or the access link 10C transmissions are on a separate frequency band, in which case the relay 20C is referred to as an outband relay.

Figure 2A:
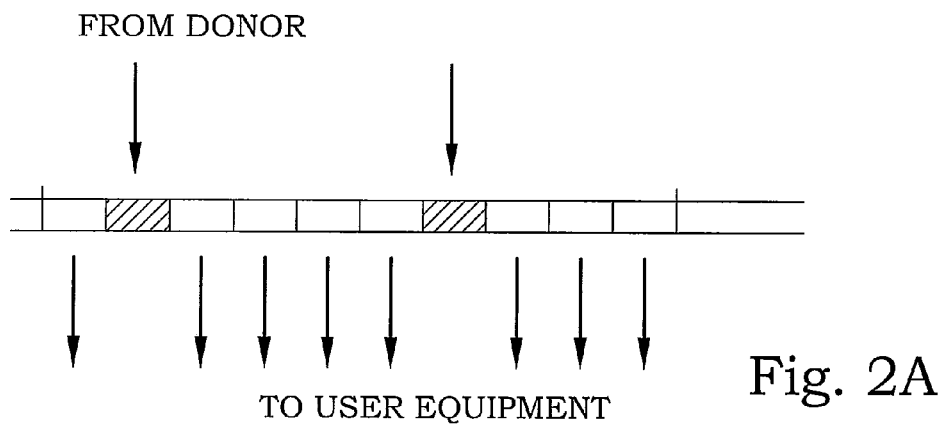
FIG. 2A is a schematic of the shared radio resources of a relay.

FIG. 2A illustrates the transmissions and receptions at an inband relay. The relay cannot transmit and receive at the same time on the same frequency, since this could cause intolerable interference. For this purpose, the cell relay configures a set of MBSFN subframes. During a certain MBSFN subframe, marked with a hatch in the figure, the UEs in the relay do not expect to receive any DL data from the relay. Instead, these subframes are used for carrying downlink data from donor-eNB to relay node. The MBSFN configuration in relay cells is typically rather fixed on a long time scale and known to eNB and the relays, respectively. The MBSFN configurations might be configured commonly for the entire network or separately in different individual relays or groups of relays.

Assume a common network MBSFN configuration, i.e. a number of subframes are allocated for backhaul link transmission. Further, this is assumed equal for DL and UL (UpLink). Now, introducing a parameter $\alpha \in [0, 1]$, representing the share of radio resources used for backhaul link transmission, the end-to-end throughput can be written as:

$$R_{end-to-end} = \min\{\alpha \cdot R_{backhaul}, (1-\alpha) \cdot R_{access}\} \quad (1)$$

In other words, the end-to-end bit rate for a user served by a relay is limited by the link that supports the lowest bit rate, depending on the backhaul allocation $\alpha$.

Figure 2B:
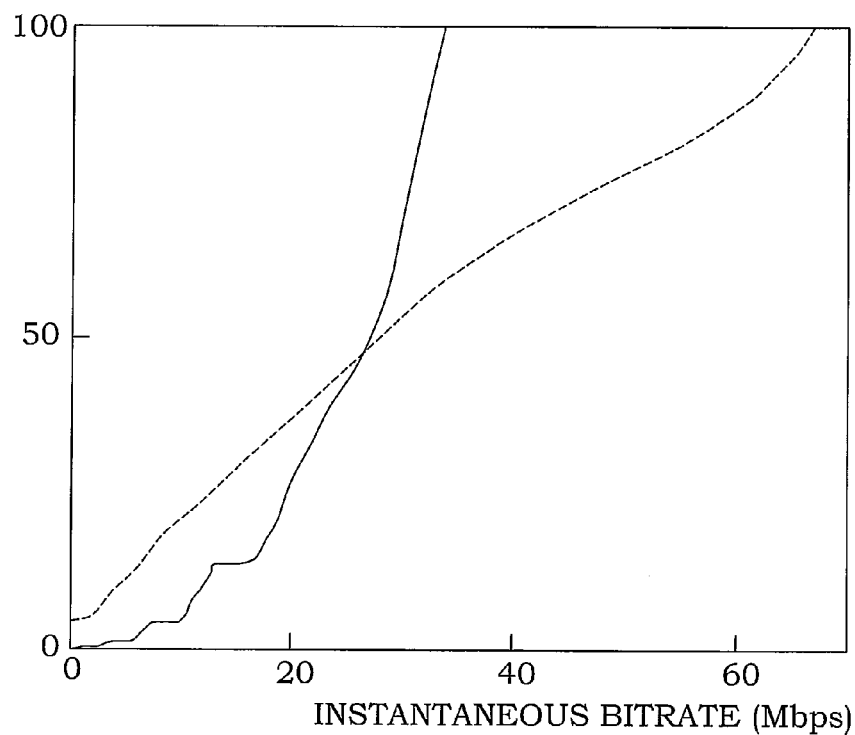
FIG. 2B is a diagram illustrating available bit rates through relays and via direct links.

An attempt to illustrate the problem is shown in FIG. 2B. The graph is the outcome of simulations performed in a static simulator and shows a CDF (Cumulative Density Function) of the bit rate achieved by users served by inband relays (solid line). For comparison, the same users' bit rates achieved directly towards the macro eNB are included (dashed line). In this simulation the UEs are connected to the access point with strongest signal. It is clear that, by investigating the intersection of the curves, around 50% of the UEs connected to relays would be better off directly connected to the eNB instead.

The basic concept of the invention is to make it possible to optimize the cell selection in a relying system, in particular in an inband relying systems. This can be done according to different approaches, relying on slightly different methods. In common is that the eNBs must have some information of the status of the neighboring cells, e.g. whether it is a relay cell, the backhaul subframe allocation of the relay cells, different output power level etc.

Coming back to the challenge of performing cell selection in an inband relaying system, assume a 50% backhaul subframe allocation; the same in DL and UL. Further assume that the access link is limiting, not the backhaul link. Now, consider FIG. 2C, where the x-axis shows the direct link SINR (Signal-to-Interference and Noise Ratio) in dB and the y-axis shows how many dB better the SINR needs to be on the access link in order to support equal bit rate on the two transmission paths.

Note that the graph will look slightly different, though still with the same characteristics, with a different configuration of the backhaul phase $\alpha$.

The first conclusion is that there is a systematic difference in the required SINR. A UE should not, from a bit rate perspective, connect to a relay if the links are equal. The standard cell selection scheme applied today is based only on the strongest signal. The second conclusion is that the difference in required SINR difference varies with link quality. A 3 dB improvement is sufficient in the low SINR region while a much higher improvement is required in the higher SINR region.

Hence, the conclusion is that it is beneficial to apply different cell selection schemes for relay eNB and normal eNBs.

In e.g. a LTE system, the cell selection and handover functionality is controlled by the network and based on measurement reports from the UEs, i.e. the UEs themselves have no influence of the actual handover decision. In other systems, the degree of UE freedom with respect to handover is sometimes higher.

The network controlled handover procedure includes two separate, equally important aspects, which are the measurement configuration of the UE and handover algorithm implemented in the eNBs. Measurement reports are transmitted from the UEs and include RSRP/RSRQ measurements towards the serving cell as well as a selected set of neighboring cells. Then the handover algorithm uses the measurements as input and evaluates the preferred handover decision.

Figure 3:
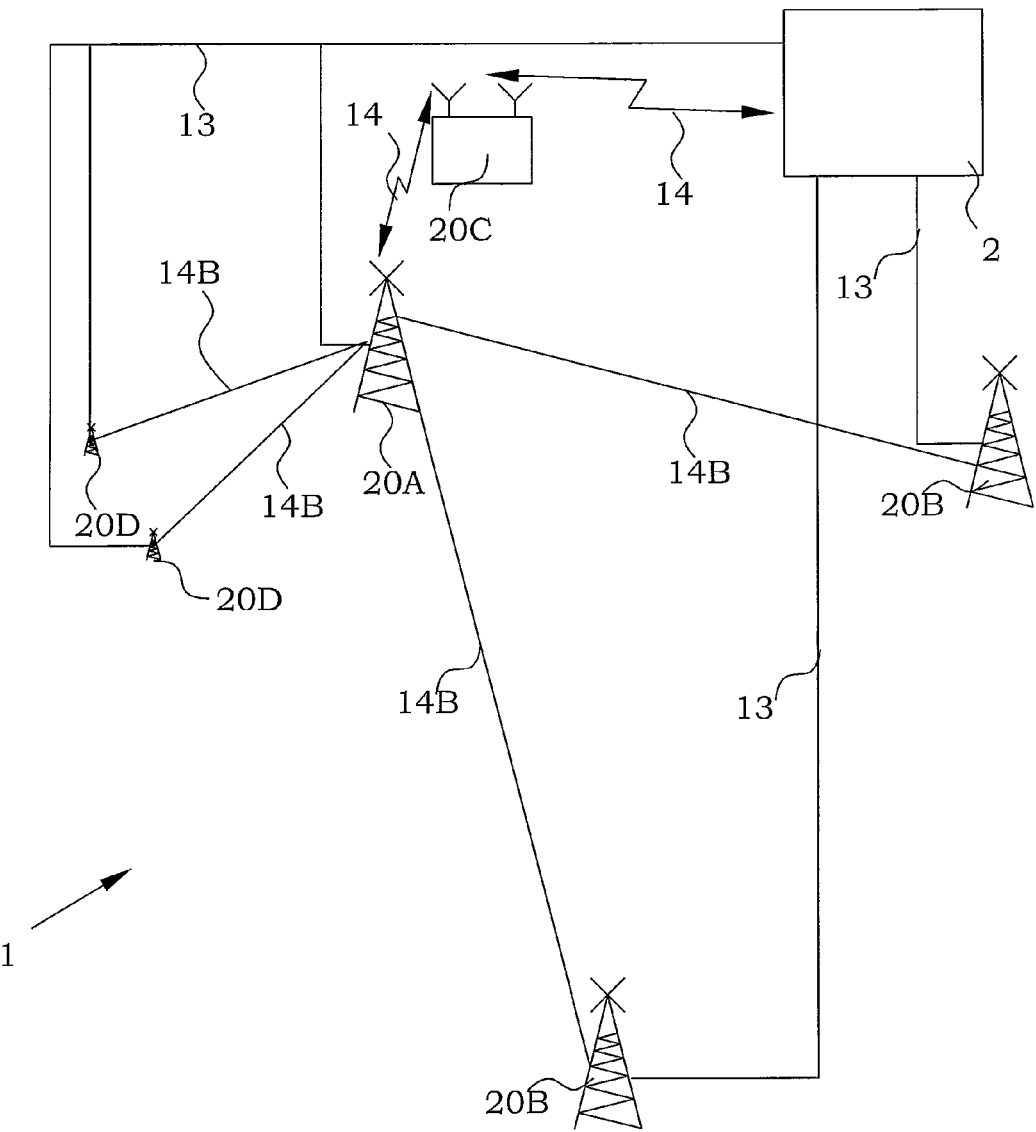
FIG. 3 is a schematic illustration of communication possibilities between Node Bs.

In a cellular communication system, the Node Bs have different possibilities for communicating with each other. FIG. 3 illustrates this in a schematic manner. A serving eNB 20A is connected to a core network 2 of the cellular communication system 1 by wired connections 13. Information from e.g. a neighboring eNB 20B, or a microcell eNB 20D can typically be obtained via the core network 2. A relay eNB 20C can typically exchange information with a donor eNB via radio connections 14 and in some systems also with the core network 2. In many cellular communication systems, wired connections 14B are also available directly between different eNBs. Such connections between Node Bs are useful for exchanging e.g. cell status information.

Figure 4A:
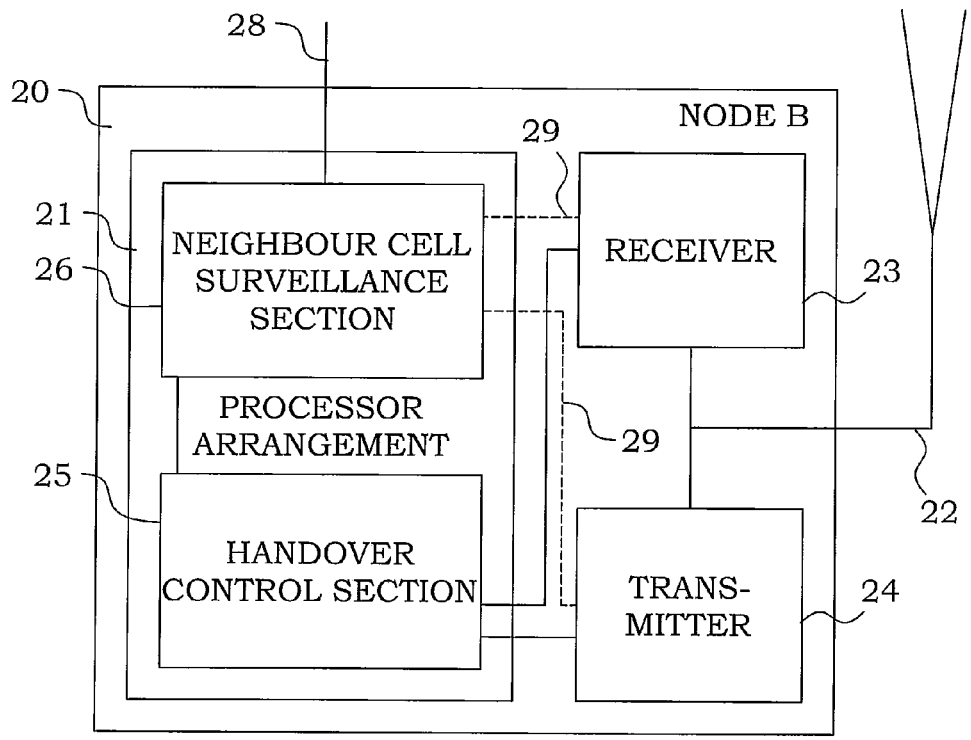
FIGS. 4A-C are schematic block schemes of embodiments of Node Bs according to the present invention.

When discussing handover procedures in cellular communication systems are mainly two types of nodes relevant; the UE and the Node B. These nodes will have somewhat different tasks to perform, but the tasks are closely interrelated. In FIG. 4A, an embodiment of a Node B 20 according to the present invention is illustrated as a schematic block scheme. The Node B 20 comprises a transmitter 24 and a receiver 23, connected to an antenna 22. The transmitter 24 and the receiver 23 are connected to a processor arrangement 21, being responsible for functionalities of the Node B20. A handover control section 25 of the processor arrangement 21 creates measurement configuration orders and provides the measurement configuration orders to the transmitter 24. The transmitter 24 is consequently arranged to transmit the measurement configuration orders from the handover control section 25 within a cell associated with the Node B 20. In an analogue manner is the receiver 23 arranged to receive measurement reports from user equipments within the cell associated with the Node B. Both the transmission and the reception are performed via the antenna 22. The handover control section 25 has more tasks to perform. The handover control section 25 accesses information comprised in the received measurement reports. This information can be processed in different manners and constitute a decision support on which handover operations can be based. In other words, the handover control section performs handover operations in dependence of the information comprised in the measurement reports.

In the present embodiment, the processor arrangement 21 further comprises a neighbouring cell surveillance section 26. The neighbouring cell surveillance section 26 is configured to obtain cell status information associated with neighbouring cells. This neighbouring cell surveillance section 26 is in the present embodiment illustrated as being separated from the handover control section 25. However, the block scheme illustration should only be considered as a functionally division. In reality, both the neighbouring cell surveillance section 26 and the handover control section 25 are typically implemented in the same physical hardware. In alternative embodiments, the different sections can even be distributed over more than one physical unit. The cell status information obtained by the neighbouring cell surveillance section 26 comprises at least information about whether or not the neighbouring cell is a cell of a different type than the serving cell. In a cellular communication system having relay Node Bs, the cell status information typically comprises at least information about whether or not a Node B for the neighbouring cell is a relay Node B or not. The cell status information could also comprise information about cell sizes, i.e. different transmit powers of the Node Bs. Also information about the MBSFN configuration could be comprised in the cell status information. Such cell status information of all kinds is also utilized by the handover control section 25 to create measurement configuration orders or to control the handover activities. In other words, measurement configuration orders are created in dependence of the cell status information.

The cell status information can be obtained in different manners. The information can be received from the cellular communication network, e.g. by a connection 28. The information may also be received by radio signals, the content of which is brought to the neighbour cell surveillance section 26 by internal connections 29 from the receiver. The neighbour cell surveillance section 26 of the present embodiment is also configured to exchange such cell status information with other Node B's, e.g. via the connection 28 or by radio via the connections 29 and the transmitter 24.

Figure 4B:
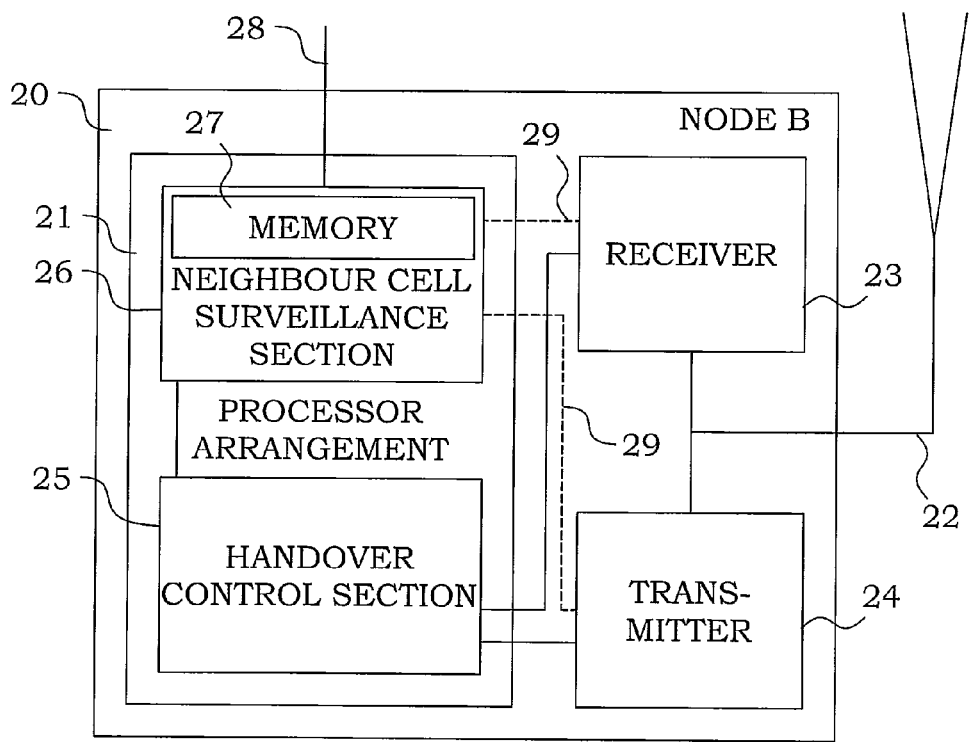

In FIG. 4B, another embodiment of a Node B is illustrated. The cell status information is typically relatively static. It is therefore convenient to store at least part of the cell status information in a memory 27. When the neighbour cell surveillance section 26 needs to obtain cell status information, it can simply be retrieved from the memory 27. The content of the memory 27 can be updated continuously or intermittently by use of the connections to the core network and/or to the other Node Bs. In cases the cell status information is very long time stable, it could even be possible to update the memory manually, e.g. by connecting another physical data storage and copying necessary information.

Figure 4C:
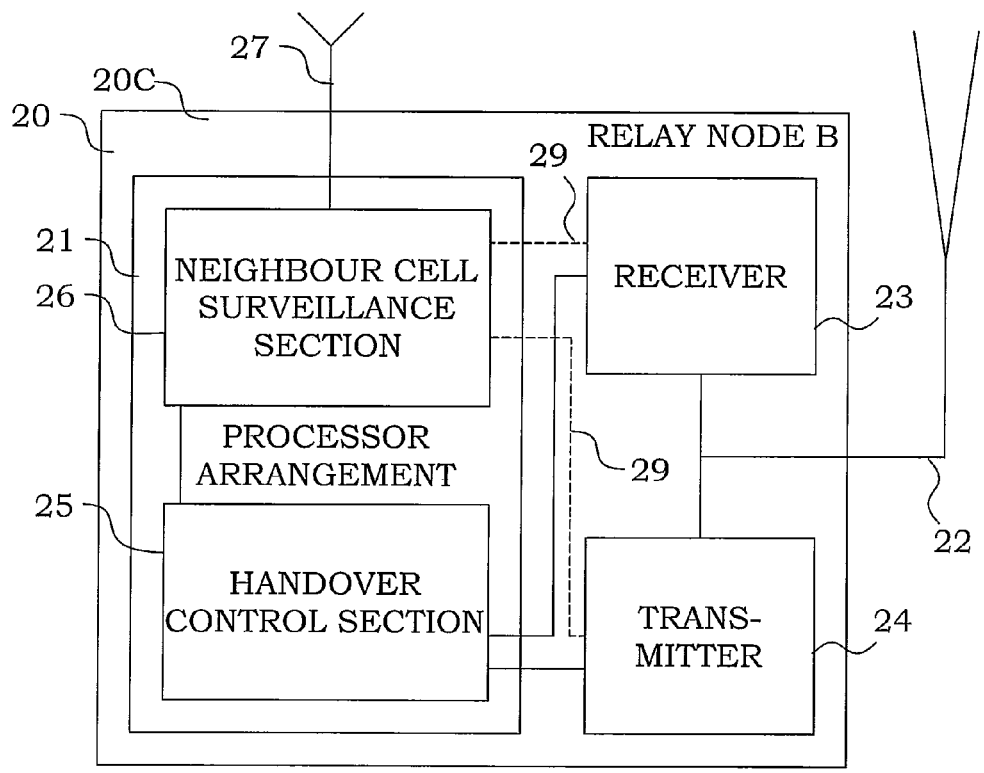

FIG. 4C illustrates an embodiment of a relay Node B 20C. The relay Node B 20C has basically the same components as in the general Node B illustrated in FIG. 4A, and they are therefore not discussed any further. The main difference is that the relay Node B doesn't have a direct connection to the core network of the cellular communication system, but communicates instead via its donor Node B by a radio connection via a backhaul antenna 27. The antennas 22 and 27 may be provided as separate units or as a combination unit.

Figure 5:
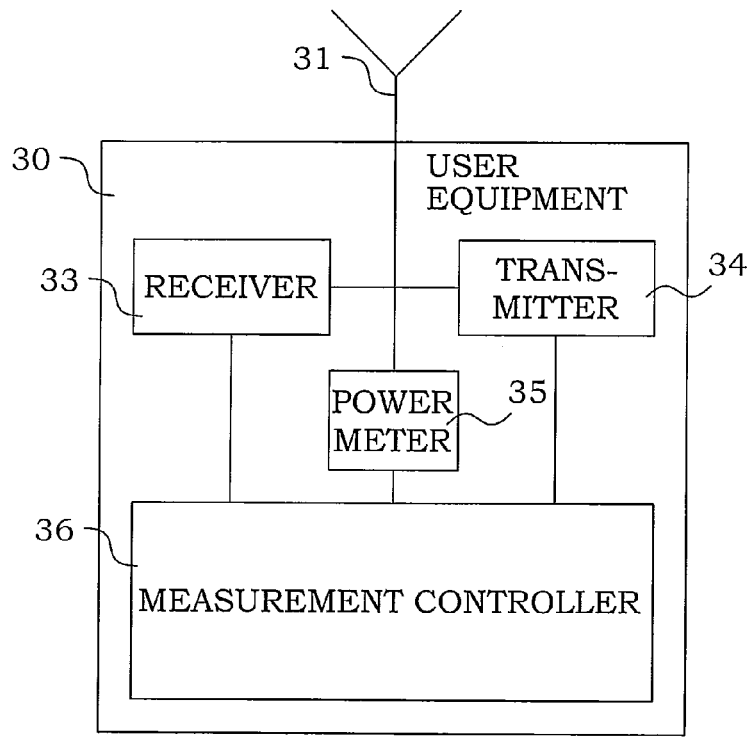
FIG. 5 is a schematic block diagram of an embodiment of a user equipment according to the present invention.

In FIG. 5, an embodiment of a user equipment 30 according to the present invention is illustrated as a schematic block scheme. The user equipment 30 is thus intended for use in a cellular communication system. The user equipment 30 comprises a receiver 33 and a transmitter 34, both connected to an antenna 31. The receiver 33 receives measurement configuration orders transmitted from a serving Node B. The user equipment 30 further comprises a power meter 35. This power meter 35 is arranged for measuring reference signal received powers for different radio signals received within the cellular communication system. A measurement controller 36 is connected to the receiver 33 and to the power meter 35. The measurement controller 36 accesses information comprised in the measurement configuration orders. Based on that information, the measurement controller 36 controls an operation of the power meter 35. The measurement controller 36 is also configured to obtain measured reference signal received powers from the power meter 35. The measurement controller 35 compiles a measurement report based on the obtained measured reference signal received powers. The transmitter 34 is connected to the measurement controller 36, and the measurement controller 36 provides the measurement report to the transmitter 34. The transmitter transmits the measurement report to the serving Node B.

In the present embodiment, the measurement configuration orders comprise cell status information associated with neighbouring cells and measurement instructions that are dependent of the cell status of the neighbouring cell from which a reference signal to be measured is received. The cell status information comprises at least information about whether or not the neighbouring cell is a cell of a different type than the serving cell. Typically, at least if the cellular communication system utilizes relay Node Bs, the cell status information comprises at least information about whether or not a Node B for the neighbouring cell is a relay Node B. The measurement controller 36 is thereby configured to perform the above described controlling of the operation of the power meter 35 or the compiling of the measurement report in dependence on the cell status of the neighbouring cell from which the signal to be measured was received.

Figure 6:
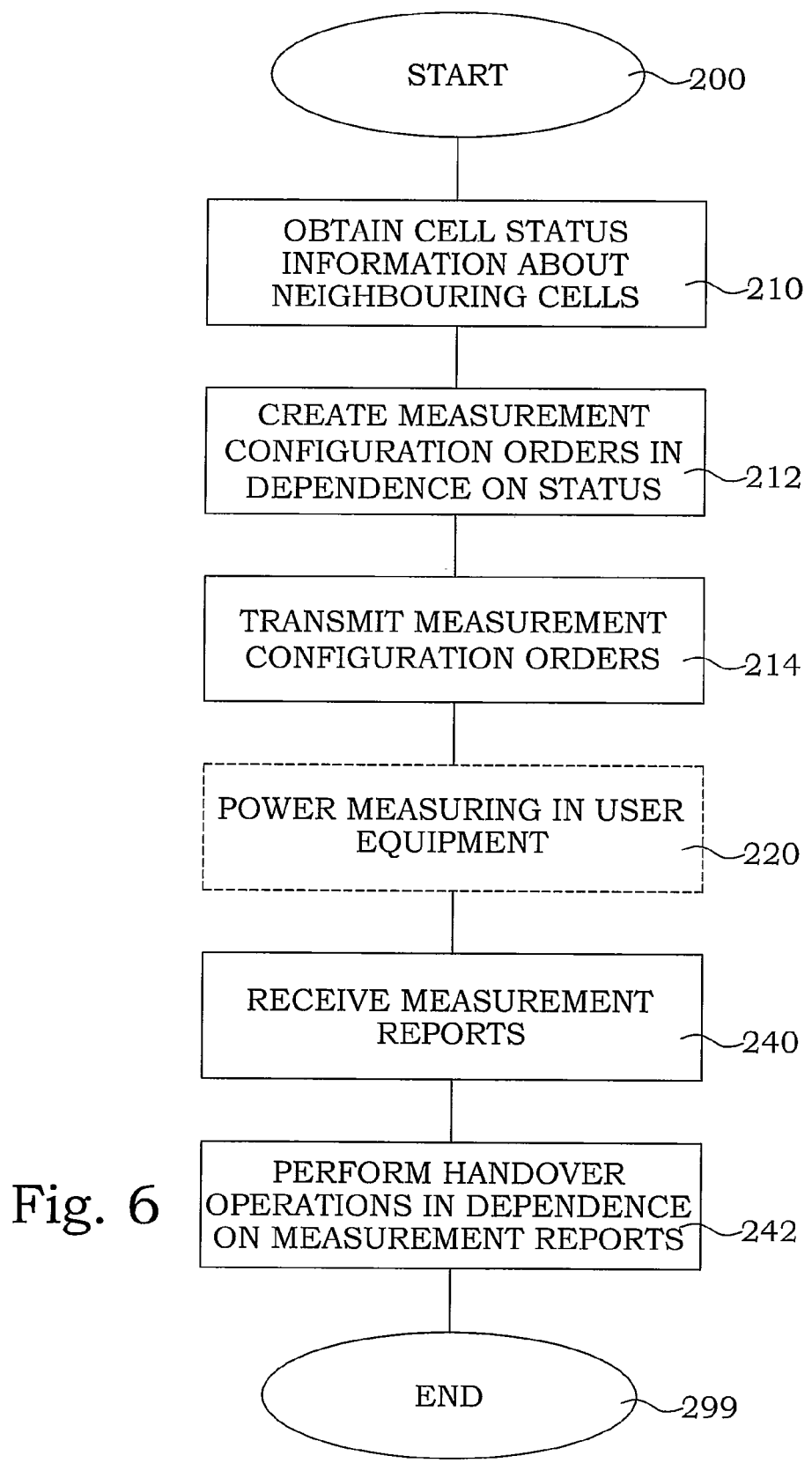
FIG. 6 is a flow diagram of steps of an embodiment of a method according to the present invention.

FIG. 6 illustrates a flow diagram of steps of an embodiment of a method according to the present invention. The main parts of the steps are typically performed in a Node B. The method for handover in a cellular communication system begins in step 200. In step 210, cell status information is obtained in a neighbouring cell surveillance section of a processor arrangement. The cell status information is associated with neighbouring cells to a cell associated with a Node B in which the processor arrangement is comprised. The cell status information comprises at least information about whether or not the neighbouring cell is a cell of a different type than the serving cell of the user equipment. In a typical case, if the cellular communication system utilizes relay Node Bs, the cell status information comprises information about whether or not a Node B for the neighbouring cell is a relay Node B. Measurement configuration orders are created in step 212. The measurement configuration orders are created in a handover control section of the processor arrangement. The measurement configuration orders are furthermore created in dependence of the cell status information. In step 214, the measurement configuration orders are transmitted from a transmitter within a cell associated with the Node B. The measurement configuration orders are intended for a user equipment that has the Node B as serving Node B.

The user equipment receives the measurement configuration orders and in step 220, power measurements are performed in the user equipment. The broken line of the box of step 220 indicates that the step is not a step performed in the Node B. The preferred details of the power measurements in the user equipment are described further below. The user equipment also provides a measurement report based on the power measurements.

In step 240, measurement reports from user equipments within the cell associated with the Node B are received in the Node B in a receiver. Handover operations are performed in the handover control section in step 242. These handover operations are performed in dependence of the information comprised in the measurement reports. The procedure ends in step 299.

Figure 7:
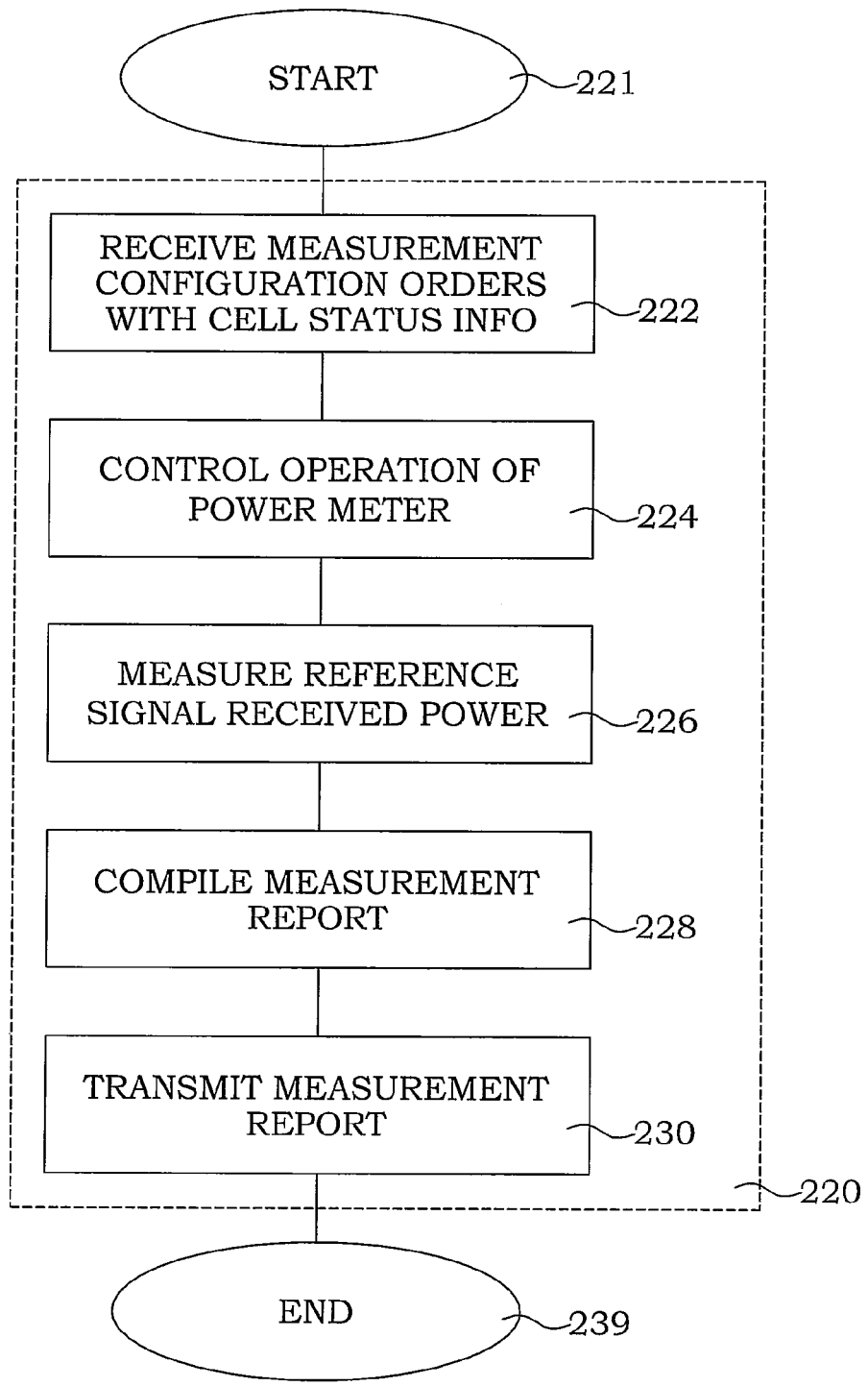
FIG. 7 is a flow diagram of steps of an embodiment of another method according to the present invention.

FIG. 7 illustrates a flow diagram of steps of an embodiment of a method according to the present invention. The steps are typically performed in a user equipment. The method for power measuring in a cellular communication system begins in step 221. In step 222, measurement configuration orders are received in a receiver. The measurement configuration orders are transmitted by a serving Node B. The measurement configuration orders comprise cell status information associated with neighbouring cells. The measurement configuration orders further comprise measurement instructions that is dependent of the cell status of the neighbouring cell from which a reference signal to be measured is received. The cell status information comprises information about whether or not the neighbouring cell is a cell of a different type than the serving cell of the user equipment. In a typical case, if the cellular communication system utilizes relay Node Bs, the cell status information comprises information about whether or not a Node B for the neighbouring cell is a relay Node B. An operation of a power meter is controlled in step 224 in dependence on the information comprised in the measurement configuration orders. Reference signal received powers are measured in the power meter in step 226. In step 228, a measurement report is compiled in the measurement controller. The measurement report is based on the measured reference signal received powers. The step of controlling of the operation of the power meter, step 224, and/or the step of compiling of said measurement report, step 228, are performed in dependence on the cell status of the neighbouring cell from which the signal to be measured was received. In step 230, the measurement report is transmitted from a transmitter to the serving Node B. The procedure ends in step 239. The steps 222 to 230 are together an example of how a step of performing power measurements 220, e.g. in FIG. 6, can look like.

Handover procedures are typically a cooperation process between the user equipment and the Node B. FIG. 8 illustrates schematically an embodiment of such a cooperation process. Cell status information 60 is obtained by the Node B. Based on the cell status, a measurement configuration order is created 61 by the Node B. As will be discussed further below, this measurement configuration order may comprise different kinds of information and/or instructions. The measurement configuration order is sent 62 to the user equipment by control signalling. The user equipment controls 63 a power meter. The control principles are typically performed in dependence on the measurement configuration order. Received powers are measured 64. The user equipment compiles a measurement report 65. This compilation may also be dependent on information or orders comprised in the measurement configuration order. The measurement report 66 is reported back to the Node B. The Node B decides whether or not there are reasons for making a handover. If there are such reasons, a handover procedure 67 is initiated.

In a typical cellular communication system, there are different alternatives for the measurement configuration.

A measurement report includes information, typically the RSRP (in LTE), of neighboring cells characteristics. The network can configure the UE to send measurement reports in two alternative ways, periodically or event-based.

In case the UE sends periodical reports, the network can run an algorithm upon reception of the report. When certain triggers are fulfilled, the network has the opportunity to initiate a handover by contacting a neighboring cell. When evaluating the most favorable UE cell selection, the network can use information regarding path loss on the different links, load, transmission power, interference situation, etc. In case of a relay deployment, the eNB or relay node would also benefit from knowledge of which cells are regular eNBs, donor eNBs or relay eNBs. If this is not known, the multiplexing loss due to inband relaying can not be compensated for. Also in an outband relay system it is likely to benefit from this information, since the backhaul transmission will use up radio resources.

With an event based measurement reporting scheme, the UE performs measurements continuously but does not send any report to the network until certain constraints have been fulfilled. Such constraints could be changed or adapted in dependence of the received measurement configuration order. If the constraints are properly tuned, the mere fact that a measurement report is sent to the Node B typically means that a handover is very likely to be performed.

An example of an event is that a neighboring cell RSRP becomes 2 dB stronger than the serving cell RSRP. Still, this type of measurement is fully network controlled, since the evaluation criteria (might be multiple), i.e. the event specifications, are configured by the network.

These two types of measurement report approaches will be discussed further in connection with certain embodiment.

In the present invention, cell status information is of importance. The information about which cells are relay eNBs as well as other information about the backhaul links, such as e.g. transmitting power, can be exchanged via inter-eNB/RN signaling, as briefly mentioned in connection to FIG. 3. In 3GPP LTE/EUTRAN (Evolved Universal Terrestrial Radio Access Network), the signaling can be performed during X2 setup or some other S1/X2 signaling or can be configured via the Operation and Maintenance system. The information exchange between eNBs can also be handled via the UEs, meaning that the information is broadcasted in one cell by one eNB and then the UE can report this information to other eNBs. This can be controlled by the eNBs requesting the UE reports. Such a scheme could enable a self-configuration of the eNBs regarding collecting information about neighboring eNBs.

Figure 2C:
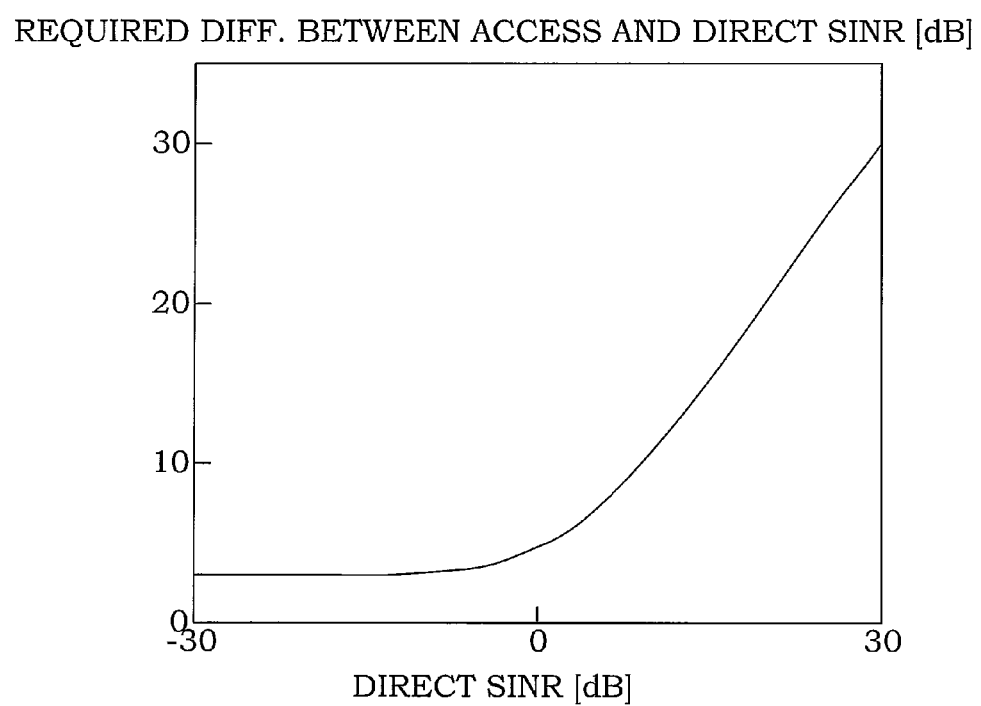
FIG. 2C is a diagram illustrating the required difference in access and direct SINR.

In the light of FIG. 2C, it is understood that it can be of interest to use different offset values for the received powers in different cells, e.g. dependent of the type of cell, the transmitting power, etc. Furthermore, since the optimum offset in a general case is link-quality-dependent, also link-quality-dependent measuring power offsets are of interest. In FIG. 9A, the cell status information comprises or is accompanied by link-quality-dependent measuring power offsets. The neighbouring cell surveillance section in the Node B is in such an embodiment configured to receive the link-quality-dependent measuring power offsets for the neighbouring cells from an external source. In other words, the process of obtaining information about link-quality-dependent measuring power offsets for the neighbouring cells comprises the action of receiving of the link-quality-dependent measuring power offsets 68 for the neighbouring cells from an external source.

However, link-quality-dependent measuring power offsets can also be derived by the Node B itself. To that end, information about backhaul link characteristics is of use. Note that the UE measurements include information of the direct and access links. The cell status information could however consider also backhaul link characteristics. That requires that such measurements are performed, by the donor and/or relay eNB, and reported so that it is available in all relevant cells. Inter eNB communication would hence also benefit from including backhaul link allocation (MBSFN allocation) and backhaul link performance, also in neighboring cells that are neither donor eNBs nor relay eNBs.

FIG. 9B illustrates such a case. In such an embodiment, the step of obtaining information about link-quality-dependent measuring power offsets for the neighbouring cells comprises the action of receiving information about at least one of backhaul subframe allocation 69 of neighbouring relay cells and output power levels of Node Bs of neighbouring cells and the action of calculating 70 the link-quality-dependent measuring power offsets from the received information. To that end, in the present embodiment, the neighbouring cell surveillance section is configured to receive information about at least one of backhaul subframe allocation of neighbouring relay cells and output power levels of Node Bs of neighbouring cells. The neighbouring cell surveillance section is further configured to calculate the link-quality-dependent measuring power offsets from the received information.

Figure 10A:
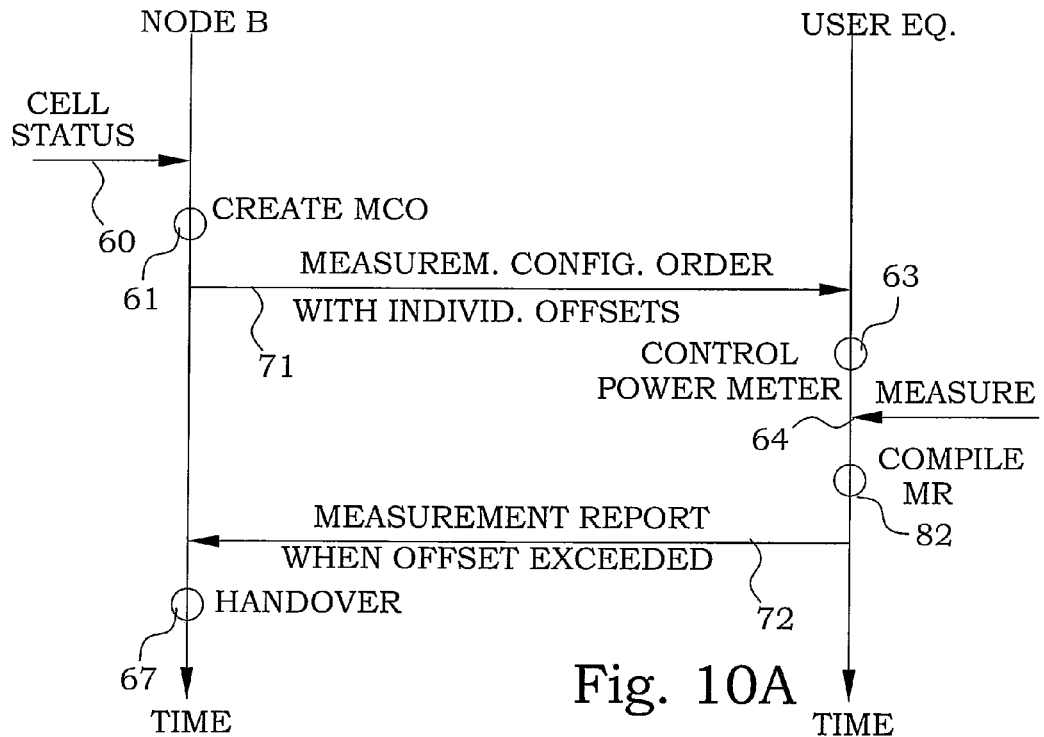
FIGS. 10A-B are schematic illustrations of embodiments of collaboration between a Node B and a user equipment according to the present invention having measurements orders concerning different Node Bs.

According the existing LTE standard, it is possible for the network to configure cell specific offsets to different cells. This is done by informing the UE of the cell index, the PCID (Physical Cell IDentity) of the cell in question and an offset to the measurement. In FIG. 10A, this possibility is utilized. The cell status information is thereby used to determine suitable offsets and a measurement configuration order with individual offsets 71 is sent to the user equipment. The individual measuring power offsets are created as being dependent of at least one of the cell status information, a prevailing link quality between a user equipment and a neighbouring cell and a prevailing link quality between a user equipment and a serving cell. To that end, the handover control section is further configured to comprise individual measuring power offsets in the measurement configuration order. Upon evaluating whether a measurement report should be generated 82 or not this offset is considered. A measurement report is thus sent when any of the offsets is exceeded 72. This is therefore a typical example of an event based measurement reporting scheme Hence, already within current standard framework, there is a possibility for the network to introduce different measurement reporting thresholds for different cells. If the cells in the network knew the status of the neighboring cells, i.e. whether they are regular eNB cells, donor eNB cells or relay cells, this methodology could e.g. be used in order to configure a threshold for relay cells compared to regular eNB cells.

Figure 10B:
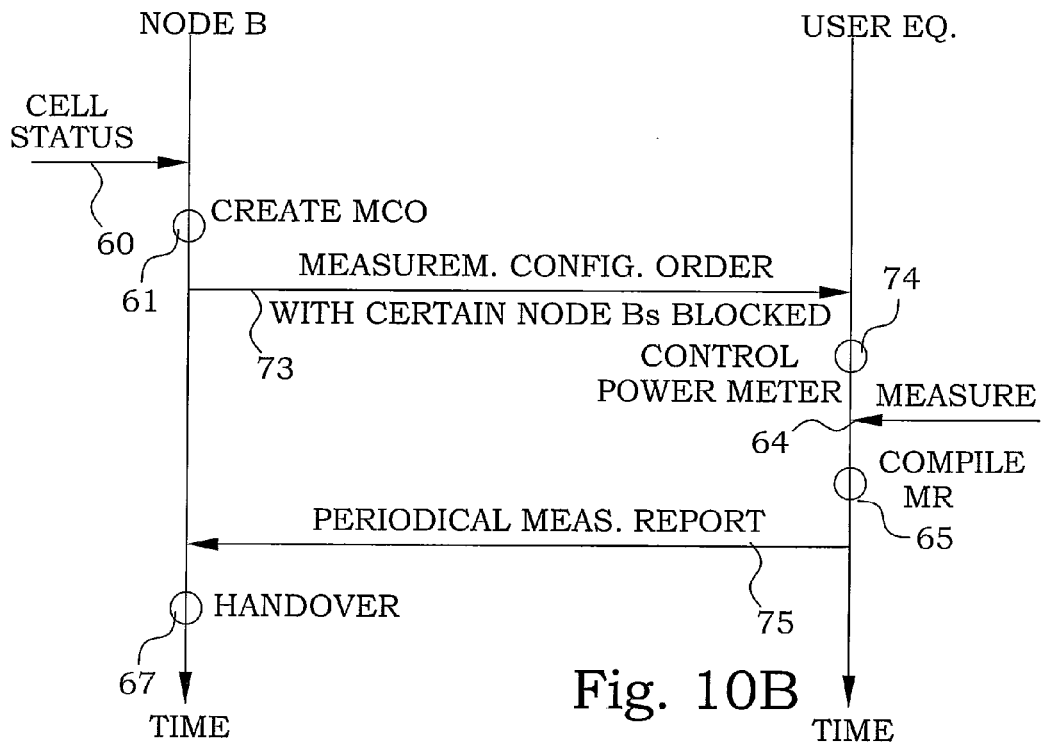

FIG. 10B illustrates another embodiment. In this embodiment, the cell status information, a prevailing link quality between a user equipment and a neighbouring cell and/or a prevailing link quality between a user equipment and a serving cell is used to determine a set of Node Bs that could be excluded from measurement. The measurement configuration orders 73 thereby comprise orders of no measurement for certain selected neighbouring cells. Thus, the handover control section is further configured to perform such creation. The user equipment may control 74 the power meter in such a manner that no measurements at all are performed on such excluded Node Bs. Alternatively, measurements can be performed but excluded during the measurement report compilation. In a typical scenario, a periodical measurement report 75 is returned to the Node B.

Figure 11A:
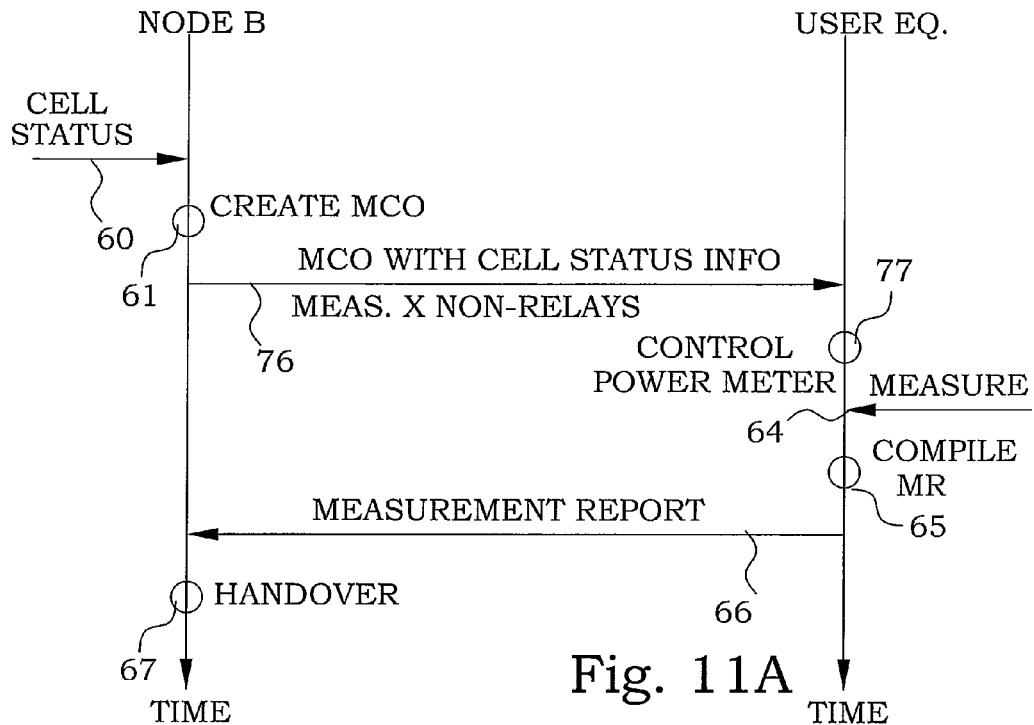
FIGS. 11A-D are schematic illustrations of embodiments of collaboration between a Node B and a user equipment according to the present invention where the operation of the user equipment is influenced by the measurements orders.

In the FIGS. 10A and 10B, the network has provided the "intelligence" for utilizing the data contained in the cell status information in the form of suitable measurement configuration orders. However, the measurement configuration of the UE may also be optimized by including additional functionality in the user equipment, making the user equipment capable of making its own decisions based on cell status information. The network therefore has to provide the cell status information, typically together with the measurement configuration orders. There are a number of potential improvement candidates that can be applied to the signaling procedure as well as UE behavior. Most of them are valid both for periodical and event based measurement reporting. Some examples are illustrated in the FIGS. 11A-D In FIG. 11A, the handover control section is further configured to comprise cell status information in the measurement configuration orders. This cell status information comprises in the present embodiment information about whether the Node B for a neighbouring cells is a relay Node Bs or not. The cell status information is provided 76 to the user equipment with the measurement configuration order. The handover control section is in the present embodiment further configured to comprise cell-status-dependent measurement instructions in the measurement configuration orders.

The user equipment controls the operation of the power meter dependent on the cell status of the neighbouring cell from which the signal to be measured was received. This is achieved by having the measurement controller configured to control the operation in such a way. In the present embodiment, the measurement controller is configured to control the operation of the power meter to measure reference signal received powers from at least a first predetermined numbers of non-relay Node Bs. In such a way, it is assured that a user equipment always will have a number of non-relay Node Bs to select, when a handover procedure is initiated. Otherwise, there might be so many rely nodes available with reasonably high power that will exclude normal Node Bs from the measurement list, despite the fact that a non-relay Node Bs anyway might be a better choice for a handover, c.f. FIG. 2C.

The knowledge of the present serving cell can also be of benefit. A rel. 10 UE could be aware of whether the serving cell is a regular eNB or a relay eNB. This could simplify the signaling and enable more advanced UE control. The knowledge of the whether an eNB is a regular or relay eNB can be broadcasted on the broadcast channel in the cells or sent to the UE using dedicated signaling.

Relays or other potential network nodes (femto eNBs, pico eNBs etc) are likely to have a lower output power compared to the macro network and hence introduce a heterogeneous deployment. This has certain implications on RRM (Radio Resource Management) related functionality. Similar to the scheme proposed for a relay based system, it could be beneficial in a heterogeneous system to configure eNBs with different output power levels to have different threshold offsets related to cell selection. To enable this eNBs must know the power of other eNBs. This can also be configured once and information can be exchanged via X2 signaling between eNBs. Therefore, in an alternative embodiment, the cell status information may also comprise information about a respective transmitting power of the Node Bs.

Figure 11B:
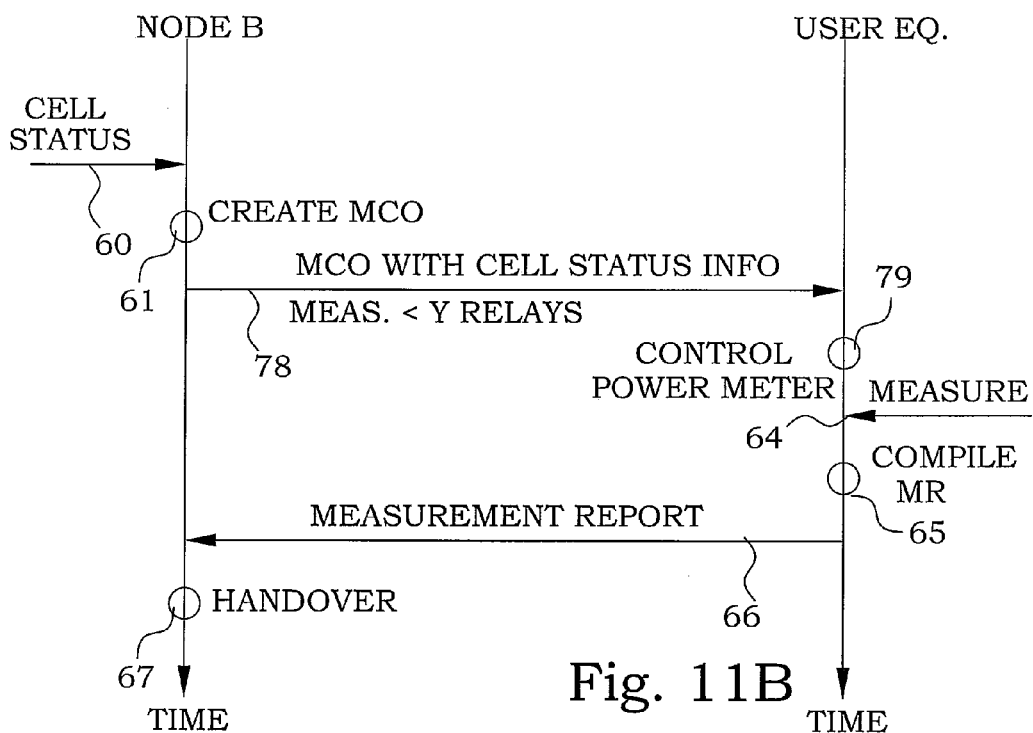

In FIG. 11B, a similar embodiment is illustrated. Here, the measurement configuration order comprises an order 78 of not measuring more than a certain number of relays. This is most beneficial in case there are many relays. The UE could then be configured to control the power meter 79 in such a way for not performing measurement on more than a maximum number of relays. The restriction can be done already at the measurement level in order to restrict the measurement operations. Alternatively, the restriction can be made at the measurement reporting level. In such a case, the restriction on the number of relay measurements can be set e.g. as a relation to the parameter maxNumberOfReportedCells. The measurement controller of the user equipment is then configured to control the operation of the power meter to measure reference signal received powers from at most a second predetermined numbers of relay Node Bs.

In analogy with FIG. 11B, the same relation can also be used for low power transmitting Node Bs. In other words, the controlling of the operation of the power meter is performed to control the power meter to measure reference signal received powers from at most a second predetermined numbers of low power transmitting Node Bs.

Figure 11C:
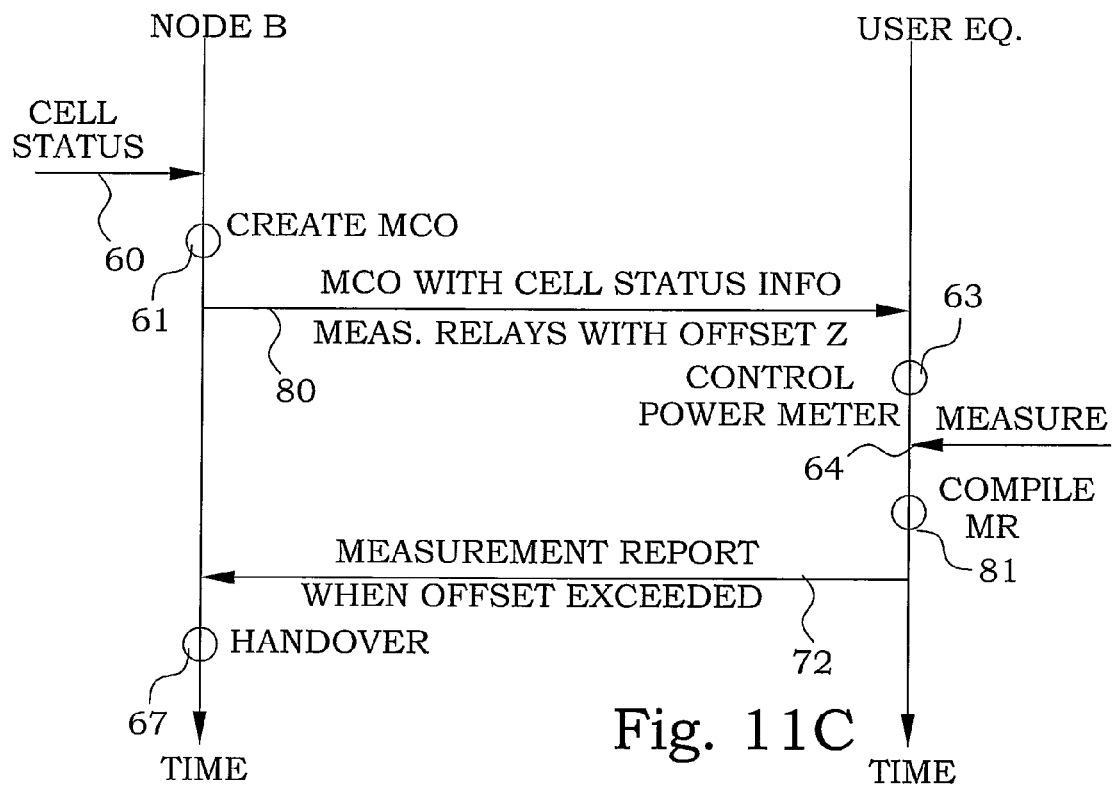

The signaling of the setting up of the measurement configuration can also be optimized. Within the current standard all offsets must be configured for each cell individually. This is not effective, especially if there are many relays. An alternative, an example of which is illustrated in FIG. 11C, would be to configure a list of several cells at the same time, possibly coded in an efficient way, which can e.g. be used for configuring all relay cells with the same offset. The list is in the present embodiment "all relays".

The measurement configuration orders do therefore in the present embodiment also comprise cell-status-dependent measurement report instructions, to measure relays with a certain offset 80. The measurement controller is configured to as a response to the measurement report instructions compile 81 the measurement report with different absolute measuring power offsets dependent on the cell status of the neighbouring cell from which the measured reference signal received power was received. In such a way, a single offset value can be valid for a whole group of Node Bs. The eNBs could inform each other in the handover request how this configuration looks like. In that case this would be done only once. This approach applies only to the event based measurement configuration.

Figure 11D:
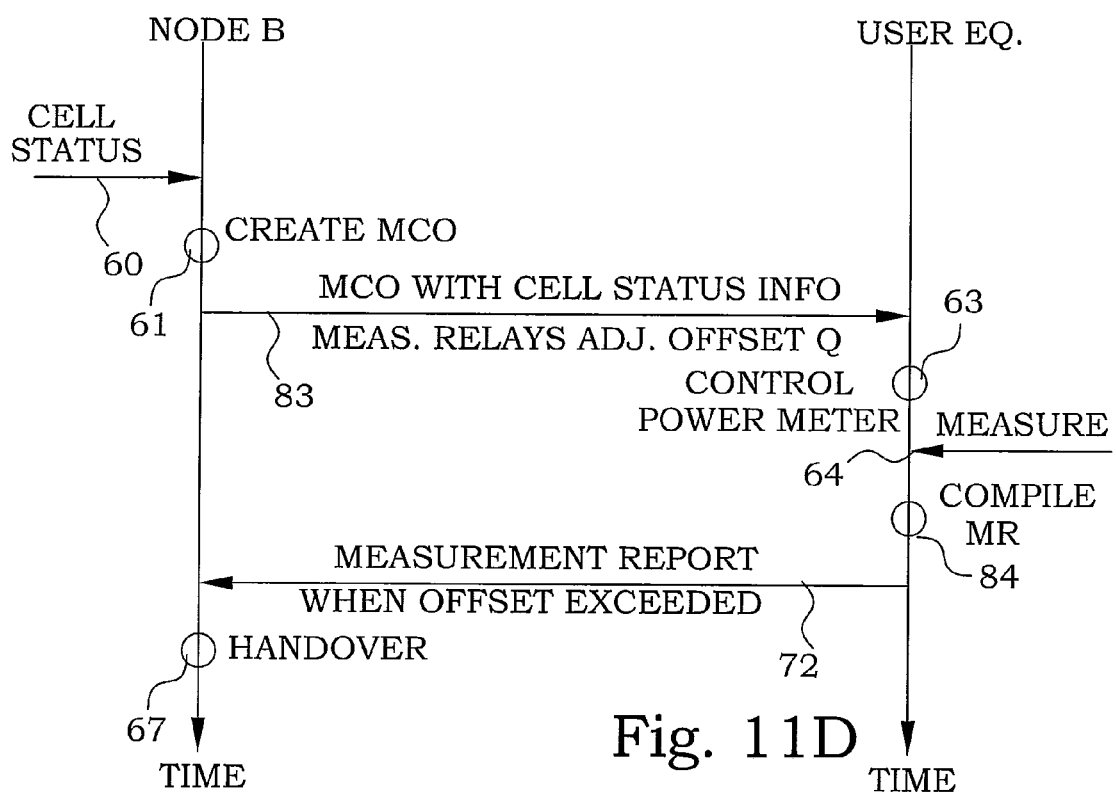

In FIG. 11D a similar embodiment is illustrated. Here, an additional measuring power offset is defined for the relays. In other words, the measurement configuration orders comprise an order to measure the relays with an additional offset 83. The measurement controller is configured to as a response to the measurement report instructions compile 84 the measurement report with a adjusted measuring power offset dependent on the cell status. In such a case, other changes in measuring power offsets can be undisturbed.

Figure 12A:
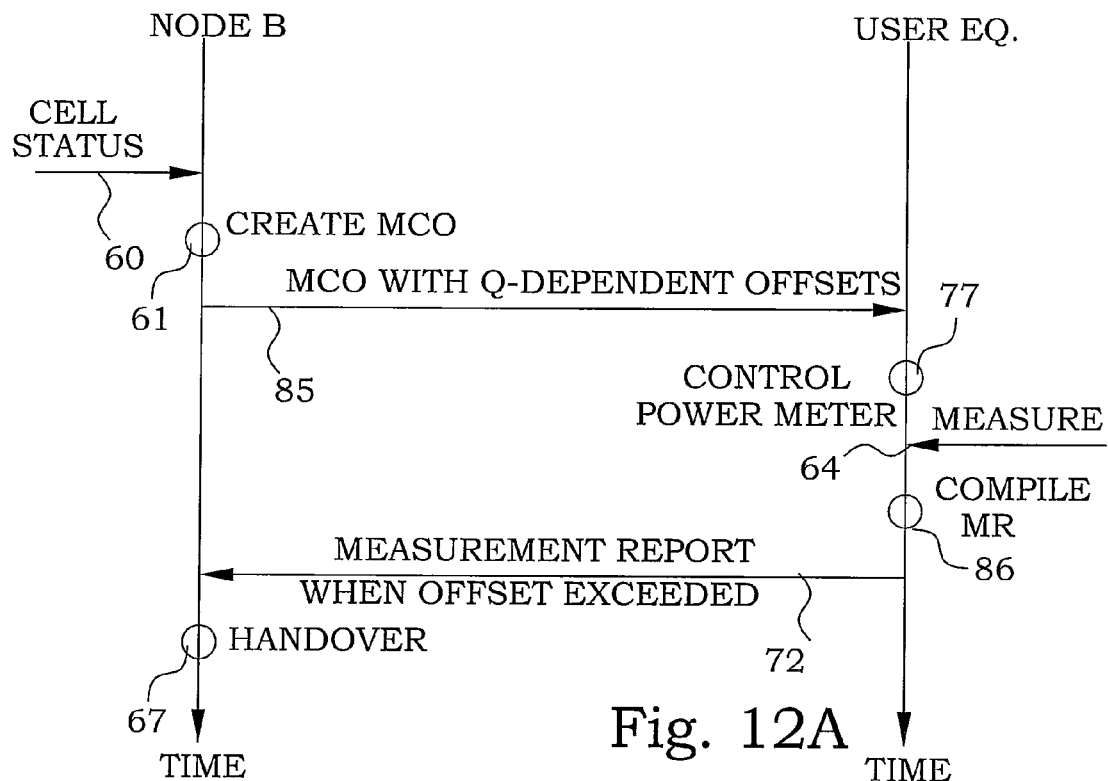
FIGS. 12A-B are schematic illustrations of embodiments of collaboration between a Node B and a user equipment according to the present invention having link-quality-dependent measurements orders.

From the diagram of FIG. 2C, it is seen that an optimal offset typically is link-quality-dependent, at least for high signal-to-noise ratios. As mentioned before the neighbouring cell surveillance section can be further configured to obtain information about link-quality-dependent measuring power offsets for the neighbouring cells. The handover control section can also be configured to comprise information about link-quality-dependent measuring power offsets associated with particular neighbouring cells, in the measurement configuration orders. In FIG. 12A, the measurement configuration orders are followed by link-quality-dependent offsets 85. The user equipment can then compile 86 the measurement report based on an adaptive offset. The user equipment could thereby be re-configured adaptively, e.g. to increase the margin in case the link quality improves or is degraded. The link quality is known in the serving cell from CQIs (Channel Quality Indicators), and the re-configuration could be done accordingly. The UE is configured with a variable threshold as a function of for instance the pathloss to serving cell, i.e. to a prevailing link quality to at least one of the serving cell and the respective neighbouring cell. The link-quality dependence can be provided in different way. A table of a set of measuring power offsets can be provided, where each measuring power offset is associated with a particular link quality range. Alternatively, the link-quality-dependent measuring power offsets are provided as a measuring power offset function being dependent on a prevailing link quality.

Figure 12B:
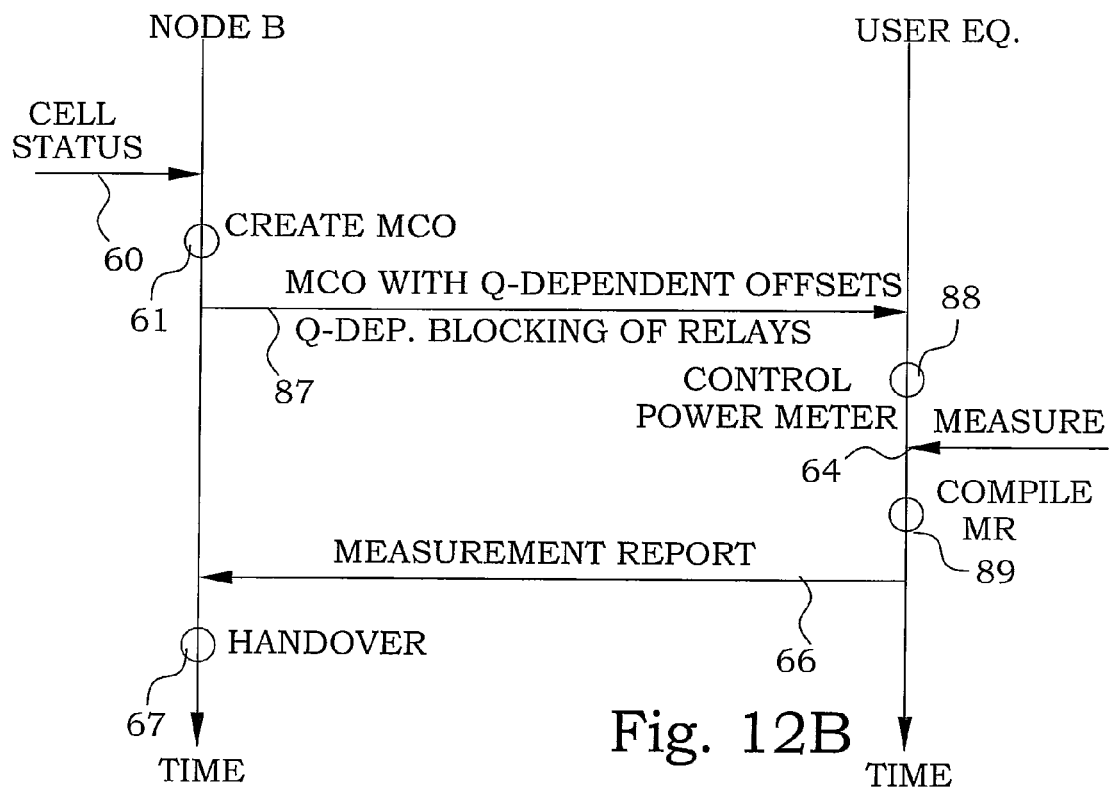

An alternative is illustrated in FIG. 12B. The UE does not consider certain or all relays for measurements or handover if the link quality is high enough, i.e. when the serving cell is a regular eNB with signal strength higher than a certain threshold. Such blocking is included in the measurement configuration orders 87. The compilation 89 does thereby only take relays into account if the link quality is below a certain level. This scheme is not limited to a certain scenario, and should be possible to be based on both DL and UL (UpLink) performance, as well as RSRP and RSRQ type of measurements.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

3GPP 3rd Generation Partnership Project
CDF Cumulative Density Function
CQI Channel Quality Indicator
DL DownLink
eNB Enhanced Node B
EUTRAN Evolved Universal Terrestrial Radio Access Network
GSM Global System for Mobile communications
HARQ Hybrid Automatic Repeat-reQuest
LTE Long-Term Evolution
MBSFN Multimedia Broadcast multicast service Single Frequency Network
PCID Physical Cell IDentity
RN Relay node
RRM Radio Resource Management
RSRP/Q Reference Signal Received Power/Quality
SINR Signal-to-Interference and Noise Ratio
TD-SCDMA Time Division-Synchronous Code Division Multiple Access
UE User Equipment
UL UpLink
WCDMA Wideband Code Division Multiple Access
WiMAX Worldwide Interoperability for Microwave Access

The invention claimed is:

1. A user equipment for use in a cellular communication system, comprising:
  a receiver, configured for receiving measurement configuration orders;
  a power meter, configured for measuring reference signal received powers;
  a measurement controller, connected to said receiver and said power meter, and being configured to access information comprised in said measurement configuration orders, to control an operation of said power meter, and to obtain measured reference signal received powers from said power meter; and
  a transmitter, connected to said measurement controller;
  said measurement controller being further configured to compile a measurement report based on said obtained measured reference signal received powers and to provide said measurement report to said transmitter;

said transmitter being configured to transmit said measurement report;

said measurement configuration orders comprise cell status information associated with neighbouring cells and measurement instructions being dependent of the cell status of the neighbouring cell from which a reference signal to be measured is received;

said cell status information comprises at least information about whether or not a Node B for said neighbouring cell is a relay Node B;

wherein said measurement controller is configured to perform at least one of said controlling said operation of said power meter and said compiling of said measurement report in dependence on whether or not said Node B from which said signal to be measured was received, is a relay Node B; and wherein said measurement configuration orders indicate no measurement depending on at least one of said cell status information, a prevailing link quality between said user equipment and a neighbouring cell and a prevailing link quality between said user equipment and a serving cell.

2. The user equipment according to claim 1, wherein said measurement controller is configured to control said operation of said power meter to measure reference signal received powers from one of:

at least a first predetermined number of non-relay Node Bs; and at most a second predetermined number of relay Node Bs.

3. The user equipment according to claim 1, wherein said cell status information also comprises information about a respective transmitting power of the Node B of said cell.

4. The user equipment according to claim 1, wherein said measurement configuration orders also comprise cell-status-dependent measurement instructions, and wherein said measurement controller is configured to control said operation of said power meter dependent on the cell status of the neighbouring cell from which said signal to be measured was received.

5. The user equipment according to claim 1, wherein said measurement configuration orders also comprise cell-status-dependent measurement report instructions, and wherein said measurement controller is configured to compile said measurement report with different absolute or additional measuring power offsets dependent on the cell status of the neighbouring cell from which said measured reference signal received power was received.

6. A Node B in a cellular communication system, comprising:

a processor arrangement;

a transmitter, connected to said processor arrangement;

a receiver, connected to said processor arrangement;

a handover control section of said processor arrangement being configured to create measurement configuration orders and to provide said measurement configuration orders to said transmitter;

said transmitter being configured to transmit said measurement configuration orders within a cell associated with said Node B;

said receiver being configured to receive measurement reports from user equipments within said cell associated with said Node B;

said handover control section being further configured to access information comprised in said received measurement reports;

said handover control section being further configured for performing handover operations in dependence of said information comprised in said measurement reports; and a neighbouring cell surveillance section of said processor arrangement being configured to obtain cell status information associated with neighbouring cells to said cell associated with said Node B wherein said cell status information comprises at least information about whether or not a Node B for said neighbouring cell is a relay Node B;

said handover control section being further configured to perform at least one of creating measurement configuration orders and performing handover operations in dependence of said Node B for neighbouring cell is a relay Node B, wherein said handover control section is further configured to comprise, for different neighbouring cells, orders of no measurement created as being dependent of at least one of said cell status information, a prevailing link quality between a user equipment and a neighbouring cell and a prevailing link quality between a user equipment and a serving cell, in said measurement configuration orders.

7. The Node B according to claim 6, said handover control section is further configured to create the measurement configuration orders comprising measuring power offsets for said neighbouring cells having a relay Node B, said measuring power offsets being dependent on a link quality of a backhaul link of said relay Node B.

8. The Node B according to claim 7, wherein said neighbouring cell surveillance section is configured to receive said link-quality-dependent measuring power offsets for said neighbouring cells from an external source.

9. The Node B according to claim 8, wherein said cell surveillance section is further configured to receive said link-quality-dependent measuring power offsets during X2 setup, by other S1/X2 signalling or configured via an operation and maintenance system.

10. The Node B according to claim 7, wherein said neighbouring cell surveillance section is configured to receive information about backhaul subframe allocation of neighbouring relay cells, and wherein said neighbouring cell surveillance section is further configured to calculate said link-quality-dependent measuring power offsets from said received information.

11. The Node B according to claim 10, wherein said cell surveillance section is further configured to receive said information about backhaul subframe allocation of neighbouring relay cells during X2 setup, by other S1/X2 signalling or configured via an operation and maintenance system.

12. The Node B according to claim 6, wherein said handover control section is further configured to comprise, for different neighbouring cells, individual measuring power offsets, being created as being dependent of at least one of said cell status information, a prevailing link quality between a user equipment and a neighbouring cell and a prevailing link quality between a user equipment and a serving cell, in said measurement configuration orders.

13. The Node B according to claim 6, wherein said handover control section is further configured to comprise, for different neighbouring cells, orders of no measurement created as being dependent of at least one of said cell status information, a prevailing link quality between a user equipment and a neighbouring cell and a prevailing link quality between a user equipment and a serving cell, in said measurement configuration orders.

14. A method for power measuring in a cellular communication system, comprising the steps of:
- receiving, in a receiver, measurement configuration orders;
- controlling an operation of a power meter in dependence on said information comprised in said measurement configuration orders;
- measuring, in said power meter, reference signal received powers;
- compiling, in a measurement controller, a measurement report based on said measured reference signal received powers; and
- transmitting, from a transmitter, said measurement report, wherein
- said measurement configuration orders comprise cell status information associated with neighbouring cells and measurement instructions being dependent of the cell status of the neighbouring cell from which a reference signal to be measured is received;
- said cell status information comprises at least information about whether or not a Node B for said neighbouring cell is relay Node B; and
- at least one of said controlling of said operation of said power meter and said compiling of said measurement report is performed in dependence on whether or not said Node B for said neighbouring cell is a relay Node B,
- wherein said measurement configuration orders indicate no measurement depending on at least one of said cell status information, a prevailing link quality between a user equipment and a neighbouring cell and a prevailing link quality between a user equipment and a serving cell.

15. The method according to claim 14, wherein said cell status information also comprises information about a respective transmitting power of the Node B of said cell.

16. A method for handover in a cellular communication system, comprising the steps of:
- obtaining, in a neighbouring cell surveillance section of a processor arrangement, cell status information associated with neighbouring cells to a cell associated with a Node B in which said processor arrangement is comprised;
- creating, in a handover control section of said processor arrangement, measurement configuration orders;
- transmitting, from a transmitter, said measurement configuration orders within a cell associated with said Node B;
- receiving, in a receiver, measurement reports from user equipments within said cell associated with said Node B; and
- performing, in said handover control section, handover operations in dependence of said information comprised in said measurement reports, wherein
- said cell status information comprises at least information about whether or not a Node B for said neighbouring cell is a relay Node B, and
- at least one of said creating of measurement configuration orders and said performing handover operations being performed in dependence of said cell status information,
- wherein said handover control section includes in said measurement configuration orders, for different neighbouring cells, orders of no measurement depending of at least one of said cell status information, a prevailing link quality between a user equipment and a neighbouring cell and a prevailing link quality between a user equipment and a serving cell.

* * * * *